United States Patent [19]

Baba

[11] Patent Number: 5,111,360
[45] Date of Patent: May 5, 1992

[54] ONBOARD TELEPHONE PACKAGE FOR VEHICLE

[75] Inventor: Teruo Baba, Tokyo, Japan

[73] Assignee: Oki Electric Industry Co., Ltd., Tokyo, Japan

[21] Appl. No.: 645,716

[22] Filed: Jan. 25, 1991

[30] Foreign Application Priority Data

Feb. 1, 1990 [JP] Japan .................. 2-020396

[51] Int. Cl.⁵ .................. H05K 7/00; H04B 1/08
[52] U.S. Cl. .................. 361/391; 361/392; 361/343; 455/89; 455/351; 455/349; 379/428
[58] Field of Search .......... 361/391, 392, 393, 339, 361/343, 357; 455/89, 90, 345, 347, 348, 349, 350, 351; 379/58, 59, 60, 428, 429, 433, 440

[56] References Cited

U.S. PATENT DOCUMENTS 4,677,654  6/1987  Lagin et al. .................. 379/58
4,868,862  9/1989  Ryoichi et al. .................. 379/58

Primary Examiner—Leo P. Picard
Assistant Examiner—Young S. Whang
Attorney, Agent, or Firm—Spencer, Frank & Schneider

[57] ABSTRACT

An onboard package for fixing a portable telephone unit within the passenger compartment of an automobile including a lower tray which is fixed within the passanger compartment, and an upper cover engaged to the lower tray so that the upper cover is operable and closable. Guides for fixing the portable telephone unit are disposed in the lower tray. A slide section for supporting an antenna cable connector is provided in the lower tray. This connector is located at a position facing a connector corresponding thereto on the telephone unit. Further, the slide section is movable in a direction in which the connector is inserted and removed. The upper cover is secured to the slide section with arms engaged with the slide section. The arms are moved in association with the opening and closing operations of the upper cover so as to move the slide section in the above-mentioned direction, whereby the connector is inserted and removed.

7 Claims, 4 Drawing Sheets

ONBOARD TELEPHONE PACKAGE FOR VEHICLE

BACKGROUND OF THE INVENTION

1. Field of the Invention

The present invention relates to a package in which a telephone is stored, and particularly to a package by which a radio telephone set is mounted on an automobile and is used thereon.

2. Description of the Related Art

There has been raised an increased demand of using a telephone anywhere, and accordingly there have been commercially available several kinds of portable telephone units to cope with this demand. These portable telephone units can access public telephone networks through a radio relay station with a manipulation similar to that used for a conventional stationary telephone unit.

An onboard telephone unit is most popular among these portable telephone units and has a peculiar arrangement. That is, in this arrangement, there can be enumerated, for example, the following matters: an antenna is mechanically independent from a telephone unit, and a power supply is annexed to the telephone unit.

First, the installation of the antenna independent from the telephone unit has the following two purposes:

(i) Articulate radio communication to and from a radio relay station should be conducted without interruption. Accordingly, radiowaves have to be prevented from being absorbed by a vehicle body of an automobile which is a cage made of metal in its substantial entirety. This cage serves as a shield for absorbing radiowaves. Accordingly, radiowaves are attenuated to such a degree that radio communication cannot be made.

If an antenna for a telephone unit is provided outboard of a vehicle, this problem can be solved. The outboard antenna is mechanically distant from the telephone unit, and is secured to, for example, an edge of the trunk lid or on the roof panel of a vehicle body through the intermediary of an insulator, at a position where the antenna can achieve the above-mentioned purposes, satisfactorily.

(ii) The antenna should be protected against electromagnetic noise which is transmitted from an ignition coil through the vehicle body. However, this problem is avoided by the telephone unit having such an outboard antenna.

However, in order to completely eliminate the effect of electromagnetic noise, not only paying attention to the position of the antenna but also applying an electromagnetic shield to a cable which connects the antenna to the telephone unit is required since this cable is likely to be subjected to the effect of electromagnetic noise transmitted through a metal part of the vehicle body.

Second, the power supply has to feed energy for all operations of the telephone unit, such as driving of a speaker, ringing of a bell and the like. It has been popular to use for this power supply the standard automobile battery.

There has been an increased demand for an onboard telephone unit which can also be used outside of the vehicle. Specifically, in addition to use the telephone unit in the inside of the vehicle, it is desirable to be able to use the telephone unit while taking a walk after the telephone unit has been lifted up and taken away from the vehicle upon alighting from the vehicle. Accordingly, in such a portable telephone unit, a miniature antenna is fixed to its casing, and further, a power source is incorporated in or is fixed to the casing. In most cases, the power source is a rechargeable battery such as an Ni-Cd battery, an Li battery or the like.

Further, a portable telephone unit of this kind has to have terminals adapted to be connected to the above-mentioned outboard antenna, and a mount for fixing the telephone unit to the passenger compartment of the vehicle.

Accordingly, there have been produced several kinds of mount systems and connectors for the antenna and the telephone unit. However, in each case, several steps of manipulation have been required for removal and installation of the telephone unit. That is, in order to set the telephone unit in the inside of the vehicle, there are required to be performed three steps including (1) setting the telephone unit at a predetermined position, (2) fixing the thus set telephone unit, and (3) connecting the cable from the outboard antenna to the telephone. Particularly, concerning the above-mentioned step (2), several kinds of connectors, such as one incorporating a screw, one incorporating a latch and the like, are used for the connector for connecting the cable to the telephone unit in order to prevent accidental disconnection. It can be enumerated as a disadvantage common to these connectors that the removal and installation of the telephone unit or the connector are time-consuming and cumbersome. This becomes more severe when the telephone unit is fixed to the inside of the vehicle.

One of most popular positions of installation of the telephone unit is a position between the driver's seat and the navigator's seat of an automobile. In the case of a vehicle in which these seats are separate, this position has a flat floor surface. Further, for the driver, this place can be most accessible and can permit the top surface of the telephone unit to be readily visible.

On the other hand, this position is not suitable for easy installation and removal of the telephone unit since this position is surrounded by obstacles such as seats, passive seat belts, switches for power windows, a shift selector, a side brake and the like. Accordingly, it is difficult to move a hand at this position for fixing and connecting the telephone unit. Sometimes the driver has to turn a connector with great difficulty. During the night-time in particular, it is dark around the installation position and is hard for the driver to see. Accordingly, the installation and removal of the telephone unit is more difficult.

Further, the above-mentioned obstacles make contact with not only the driver's hand but also the cable or the mount so as to impose a stress thereon. As a result, these obstacles might cause breakage of the cable, damage of the electromagnetic shield, damage to the mount, deformation of or damage to the connector or the like.

SUMMARY OF THE INVENTION

One object of the present invention is to provide an onboard package for a portable telephone unit, by which the portable telephone unit can be fixed to the passenger compartment of a vehicle with a very simple manipulation.

Another object of the present invention is to enable the coupling and decoupling of a connector with a simple manipulation.

A further object of the present invention is to provide an onboard package for a portable telephone unit even having a casing mounted on a vehicle at a position where the casing is not easily accessible by a human hand, which can surely fix the body of the telephone unit and a connector.

Still another object of the present invention is to provide an onboard package which can be easily removed and installed by the driver with his one hand even in a dark passenger compartment of a vehicle.

Another object of the present invention is to provide an onboard package for a portable telephone unit which can prevent failures such as inferior contact of a connector, breakage of a cable and the like due to an inappropriate work effort during coupling and decoupling of the connector.

DETAILED DESCRIPTION OF THE PREFERRED EMBODIMENT

Figure 1:
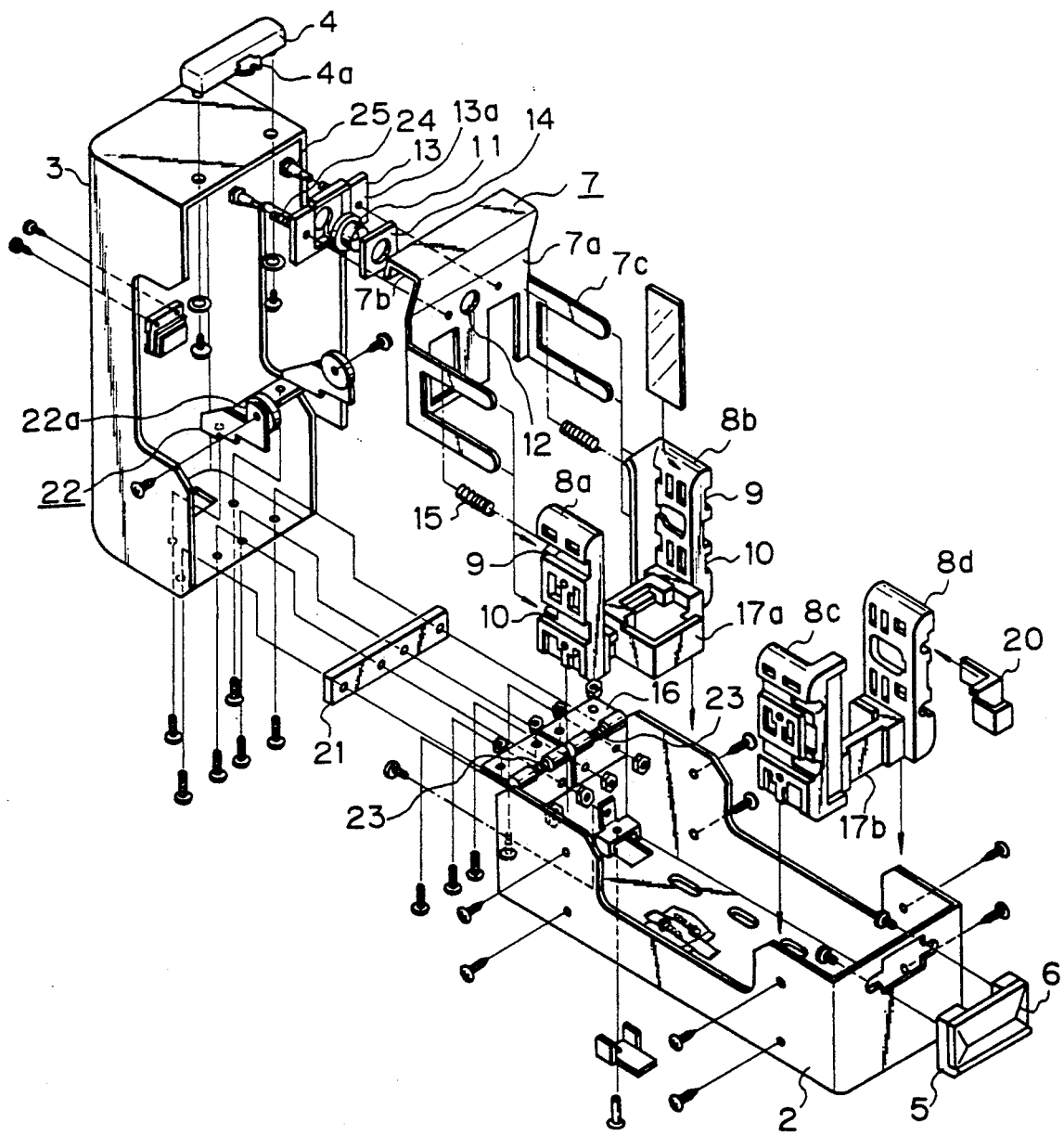
FIG. 1 is an exploded perspective view illustrating component parts of an onboard package according to the present invention.

Explanation will be made of an embodiment of the present invention with reference to the drawings:

Referring to FIG. 1 which is an exploded perspective view illustrating the structure of an onboard package, there is shown a lower tray 2 which is directly or indirectly fixed to an armrest, a floor panel or the like in the passenger compartment of a vehicle at a suitable position. The lower tray 2 is made of materials which have a high shock resistance and which are hard to be thermally deformed and to be strained, in view of the circumstances in the passenger compartment of the vehicle. Further, the lower tray is fixed preferably in such a way that a cushion material is disposed between the lower tray 2 and the vehicle body. Bases 17a, 17b and guides 8a, 8b, 8c, 8d are attached to the inside of the lower tray 2. Each of these bases 17a, 17b and the associated guides 8a, 8b or 8c, 8d are assembled so as to constitute a U-like shape clamp. A telephone unit adapted to be fixed to the lower tray 2 will be detailed later. A spacer 20 attached to the guide 8a is held between the lower tray and the telephone unit so as to restrain swing motion of the telephone unit. Another spacer similar to the spacer 20 may be attached to the guide 8c. A hinge 16 which is attached to one end part of the lower tray 2 is restrained by a stopper 21 from rotating. This hinge 16 is attached thereto with a torsion coil spring 23 which urges the hinge 16 in such a direction that the latter is normally brought in contact with the stopper 21.

Further, the hinge 16 is attached thereto with an upper cover 3 which tends to stand upright under the actions of the above-mentioned hinge 16, the stopper 21 and the torsion coil spring 23 in order to prevent such an event that the upper cover 3 be brought into contact, in its open condition, with a shift lever so as to hinder a manipulation by the driver, and would fall down onto the rear floor panel so as to disable the driver from touching it with one hand. The upper cover 3 has a knob 4 attached thereto with a pawl 4a on the side remote from the hinge 16. The lower tray 2 which has attached thereto a slide knob 6 through the intermediary of a slide mount 5, has a projection which is not shown and which is adapted to be engaged with the pawl 4a when the upper cover 3 is closed. This engagement causes the upper cover 3 to be secured in an open condition, overcoming the urging force of the torsion coil spring 23.

When the slide knob 6 is pushed in its longitudinal direction together with the projection after the upper cover 3 is closed, the pawl 4a is released from the engagement with the projection. Simultaneously with this release, the upper cover 3 is opened under the urging force of the torsion coil spring 23.

A lever 22 is fixed to the inside of the upper cover 3. This lever 22 is engaged with the slide section 7. That is, a pivot 22a at the forward end of the lever 22 is loosely fitted in an U-like shape groove part 7b of the slide section 7 at the upper end of the latter. The pivot 22a is rotatable, relative to the U-like shape groove part 7b, and further is movable in the vertical direction. The slide section 7 is movable only in the longitudinal direction of the lower tray 2. Further, the slide section 7 has arms 7c which are extended in the longitudinal direction of the lower tray 2. These arms 7c are loosely fitted in groove parts 9 and 10 formed in the guides 8a, 8b. Further, compression springs 15 are disposed between the guides 8a, 8b and the slide section 7 which is therefore urged toward the hinge 16. Accordingly, the slide section 7 can be moved in the longitudinal direction of the lower tray 2 in association with the opening and closing operation of the upper cover 3.

The slide section 7 is attached to the upper coner 3 with a connector 11 which is brought into contact at its one surface with the slide section 7 through the intermediary of a bump rubber 14. At this surface, the connector 11 is projected toward the arm 7a of the slide section 7, piercing through a through-hole in the bump rubber 14.

This connector 11 is pressed at its opposite surface by a pressure plate 13 in which through-holes 13a are formed. Posts 25 which are fixed at one end thereof to the slide section 7 pierce through these through-holes 13a so that they are movable in a direction parallel with the post 25. Compression coil springs 24 which are inserted on the posts 25 are retained at one end by the one end of the posts 25 and at the other end by the pressure plate 13. Accordingly, the compression springs 24 urge the pressure plate 13 toward the slide section 7.

Under the actions of the compression springs 24 and the bump rubber 14, the connector 11 can be moved in the longitudinal direction of the lower tray 2, relative to the slide section 7.

Figure 2:
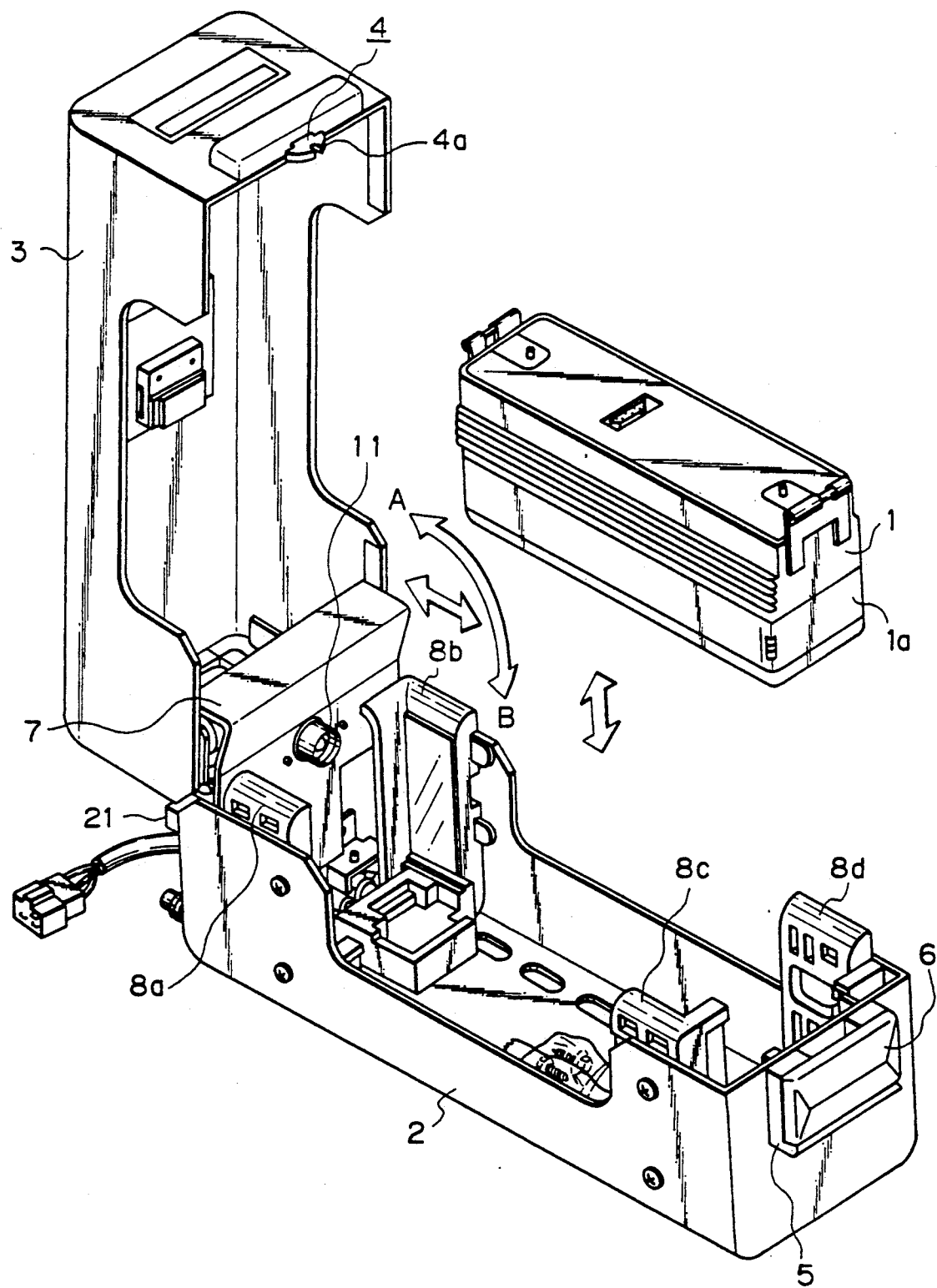
FIG. 2 is a perspective view illustrating the onboard package, according to the present invention, in an assembled condition.

FIG. 2 is a perspective view illustrating the package which is assembled with the use of the components shown in FIG. 1. In FIG. 2, there is shown the telephone unit 1 independent from the package. It is noted that a handset is abbreviated. Further, there is shown a power source 1a in which a battery is incorporated.

FIG. 2 is a view illustrating the package with the upper cover 3 being opened. In this condition, the slide section 7 comes to a position which is nearest to the rear part of the lower tray 2, that is, at a position where the rotation of the upper cover 3 is restrained by the stopper 21. In this condition, the forward end of the connector 11 is at a position where it allows the installation and removal of the telephone unit 1.

In this condition, when the telephone unit 1 is inserted into the lower tray 2 from above, the telephone unit 1 is supported by guides 8a, 8b, 8c and 8d, and accordingly, the telephone unit 1 cannot be moved in a direction perpendicular to the longitudinal direction of the lower tray 2. In this condition, when the upper cover 3 is turned in the direction of the arrow B so as to be closed, the pawl 4a is engaged with a projection which is not shown and which is formed on the rear side of a push button 6. Accordingly, the upper cover 3 is fixed in a condition in which the upper cover 3 is superposed on the lower tray 2. Simultaneously, the upper surface of the telephone unit 1 is pressed by the upper cover 3. As a result, the telephone unit 1 cannot be moved also in the vertical direction. Further, simultaneously with the closing of the upper cover 3, the slide section 7 is moved toward the telephone unit 1 which is accordingly subjected to an external force in a direction toward the push button 6 from the stopper 21 by the slide section 7. At the same time, the motion of the telephone unit 1 in the direction of this external force is limited by the stopper 20 incorporated to the guide 8d, and accordingly, the telephone unit 1 cannot be moved in the longitudinal direction of the lower tray 2. As a result, the telephone unit 1 is completely secured within the lower tray 2. Further, only closing of the upper cover 3 is necessary for this manipulation.

The connector 11 is moved together with the slide section 7 when the upper cover 3 is closed. Further, the connector 11 faces an associated connector (not shown) on one side surface of the telephone unit 1. As mentioned above, when the connector 11 is moved in association with the closing operation of the upper cover 3, the connector 11 approaches the associated connector and then is engaged thereto. At this time, both connectors establish electrical connection since the direction of insertion of the connector 11 is the same as the direction of the movement of the connector 11 in association with the opening and closing of the upper cover 3, and since both connectors face together.

However, according to the present invention, even with a deviation between the positions or directions of both connectors having such a degree that is within a manufacturing tolerance thereof, the above-mentioned operation can be surely made, because the connector 11 can be moved to a certain degree, relative to the slide section 7 in all directions so that it can be inclined. For example, when the telephone unit 1 is slightly inclined with respect to its inherent fixed position within the lower tray 2, an external force exerted upon both connectors includes a component orthogonal to the direction of insertion of the connector. Accordingly, should the external force exerted upon both connectors be large, deformation or damage of the connectors, or breakage of the connector attaching section would be caused.

However, with the arrangement shown in FIG. 2, it is sufficient for preventing the above-mentioned trouble to suitably adjust the spring constant of the compression coil springs 24 since the external force is exerted upon the slide section 7, the posts 25, the compression coil springs 24, the pressure plate 13 and the connector 11, successively in that order. The external force exerted upon the connector 11 does not exceed the sum of the repulsion forces to the compression coil springs 24. Further, for a similar reason, even a force exerted obliquely to the connector is canceled by imbalances among repulsion forces of the compression coil springs 24. Accordingly, both connectors are held in such a condition they are substantially not deviated from each other and are not inclined. Although the connector 11 is deviated or inclined relative to the slide section 7, this deviation or inclination is compensated by a deformation of the bump rubber 14 which also serves to protect the connector 11 against a shock accompanying an abrupt opening and closing of the upper cover 3.

Figure 3:
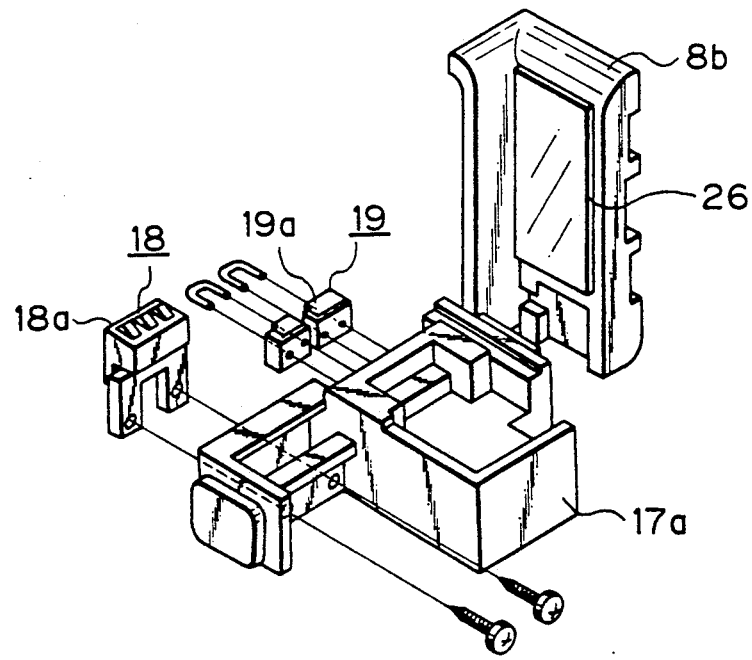
FIG. 3 is an enlarged view illustrating terminals and switches of the onboard package, according to the present invention, in an attached condition.

FIG. 3 shows an arrangement for switches and terminals around the base 17a, in which there are shown crimp style terminals 18a having upper surfaces on which projections 18 made of electroconductive materials are formed. These projections 18a can be resiliently retracted by a downward external force. These projections 18a are adapted to make contact with flat terminal plates which are not shown and which are provided at the bottom surface of the telephone unit 1 so as to establish an electrical connection. Further, there is shown microswitches 19, each composed of a movable contact 19a which is formed of a metal plate and which is adapted to abut an insulating part on the bottom surface of the telephone unit 19a so as to flex. This flex causes the movable contact 19a to make contact with a small metal projection on the microswitch 19 so as to establish another electrical connection.

What circuits are connected with each other by these terminals and the microswitches do not come under the gist of the present invention. However, there can be enumerated DC power supply terminals connected to lines from an onboard battery, terminals for connection to an exclusively onboard handset, and a switch for connecting in and cutting off power from a power source incorporated in the telephone unit. Further, the same can be said as to the shape and number of the connectors 11. The insertion and removal of the connectors 11 can be made by moving the connector 11 in one direction. Further, any kind of connector can be used as the connector 11. Accordingly, it should not be limited to that shown in the drawings, which is for a coaxial cable that is suitable as an antenna cable. It is possible to use a DIN connector for the above-mentioned connector 11. However, in a case where a plurality of connectors are used together, particularly in a case where a multiple pin connector is used, a large force for insertion and removal of the connectors is required. In this case, it is most preferable to increase the number of the compression coil springs 24 since this increases the number of points which urge the pressure plate 13 so as to restrain the pressure plate from being inclined with respect to the slide section 7. For a similar reason, in the case of using a plurality of connectors, attention should be paid so as to obtain a symmetrical distribution of necessary forces for insertion and removal of the connectors. In such a case that one large-size multiple pin connector and a plurality of small-size single pin connectors are used, as one example in which a symmetrical distribution of forces is reflected in the design, the multiple pin connector may be disposed among the single pin connectors at the center of the latter while the single pin connectors are arranged symmetrically with each other. If the arrangement of the connectors is subjected to a limitation due to a need to implement countermeasures against noise or the like, the arrangement of the compression coil springs is preferably devised so as to restrain the inclination of the slide section 7. Further, irrespective of the number of compression springs 24 to be used, it is preferable to unify the specifications of the coil springs, such as their spring constant, free length and the like. This is because of inevitable deterioration of the compression coil springs 24 after long use thereof. Further, owing to the unification of the specifications of the springs, the effect of the deterioration upon the movement of the slide section 7 can be kept to be minimum since the degree of deterioration of the compression springs 24 can be substantially unified.

Figure 4:
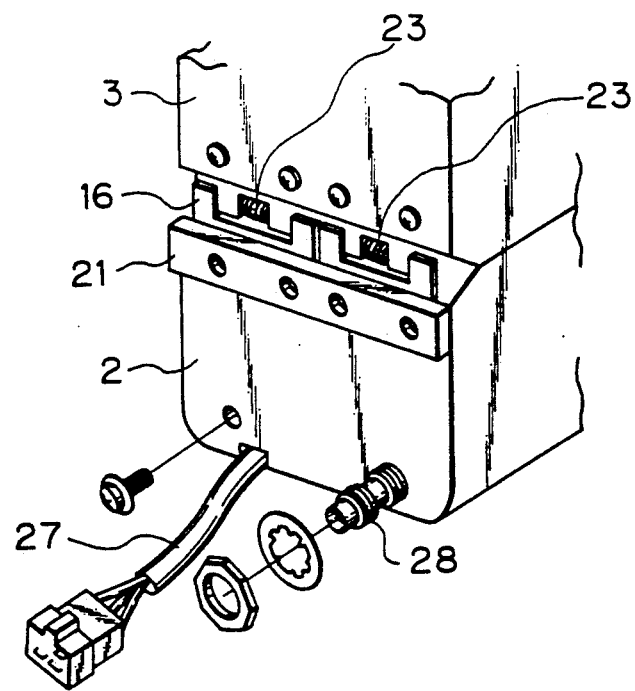
FIG. 4 is a perspective view illustrating the rear surface of the onboard package according to the present invention.

FIG. 4 is a view showing elements near the hinge 16 with the upper cover 3 closed. In this figure, there are shown a cable 27 and a connector 28. This cable 27 is adapted to be connected to the crimp style terminals 18 and the microswitches 19 shown in FIG. 3, and the connector 28 is adapted to be connected to the connector 11. Thread grooves are formed on the outer peripheral surface of the connector 28 in order to prevent the connector 28 from accidentally coming off, since the lower tray 2 is permanently arranged in the passenger compartment of the vehicle and is not required to be removed.

Figure 5:
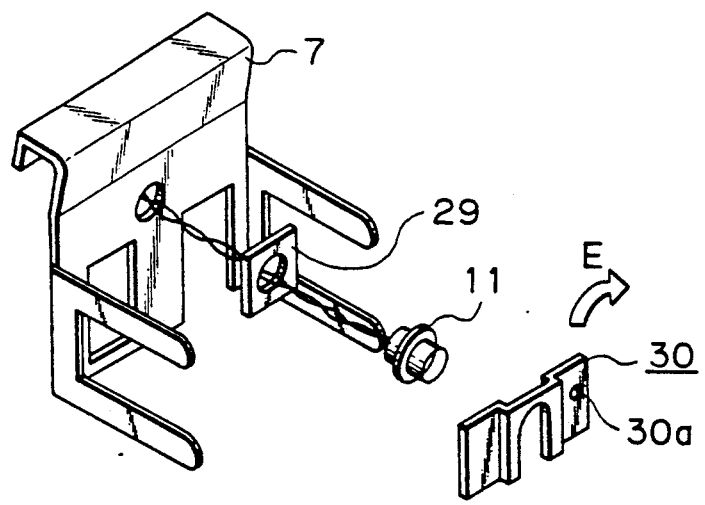
FIG. 5 is an enlarged view illustrating a variant form of the above-mentioned onboard package according to the present invention.

Although in the embodiment of the present invention as described above the connector 11 is inserted and removed in association with the opening and closing operation of the upper cover 3 as it may be easily modified, as shown in FIG. 5, in such a way that the connector 11 is only connected in association therewith in a case of use of a special purpose transceiver, in particular in a case where a high reliability is required. More specifically, a bump rubber 29 and a pressure plate 30 are used instead of the bump rubber 14 and the pressure plate 30, respectively, so as to cope with this modification. In this arrangement, the bump rubber 29 and the pressure plate 30 are attached on the side opposite to those shown in FIG. 1. Further, the pressure plate 30 is rotatable about a pivot 30a in the direction of the arrow E. The pressure plate 30 releases the connector 11 from the slide section 7 when it is rotated in the direction of the arrow E. The thus released connector 11 cannot be removed from the telephone unit 1 even though the upper cover 3 is opened. Accordingly, even when the upper cover 3 is opened unexpectedly, it is possible to prevent an interruption of telephone communication. Further, various kinds of modifications are possible within the concept of the present invention.

What we claim is:

1. An onboard package for a portable telephone unit, including
    a lower tray to be fixed at a suitable position in a passenger compartment of a vehicle;
    an upper cover engaged with said lower tray so that the upper cover is openable and closable;
    guides for fixing a body of the telephone unit within said lower tray;
    a connector to be connected to the telephone unit;
    a slide section, supported by said lower tray so that the slide section is movable in a direction in which said connector is inserted and removed, for supporting said connector so that said connector faces the body of the telephone unit; and
    arms fixed at one end to said upper cover and engaged at the other end with said slide section, for moving said slide section by a predetermined distance in association with opening and closing operations of said upper cover.

2. An onboard package for a portable telephone unit as set forth in claim 1, wherein said slide section supports a plurality of connectors, including a connector for antenna cable, which correspond to connectors on the telephone unit.

3. An onboard package for a portable telephone unit as set forth in claim 1, further comprising crimp style terminals for connecting a wiring from said lower tray with a wiring from the portable telephone unit when the portable telephone unit is secured to said lower tray.

4. An onboard package for a portable telephone unit as set forth in claim 1, further comprising a switch for connecting and disconnecting contacts in association with installation and removal of the portable telephone unit on and from said lower tray.

5. An onboard package for a portable telephone unit as set forth in claim 2, further comprising a crimp style terminal for connecting a wiring from said portable telephone unit to a wiring from said lower tray when said portable telephone unit is fixed to said lower tray.

6. An onboard package for a portable telephone unit as set forth in claim 2, further comprising a switch for connecting and disconnecting contacts in association with installation and removal of said portable telephone unit on and from said lower tray.

7. An onboard package for a telephone unit as set forth in claim 5, further comprising a switch for connecting and disconnecting contacts in association with installation and removal of said portable telephone unit on and from said lower tray.

* * * * *